UNITED STATES PATENT OFFICE.

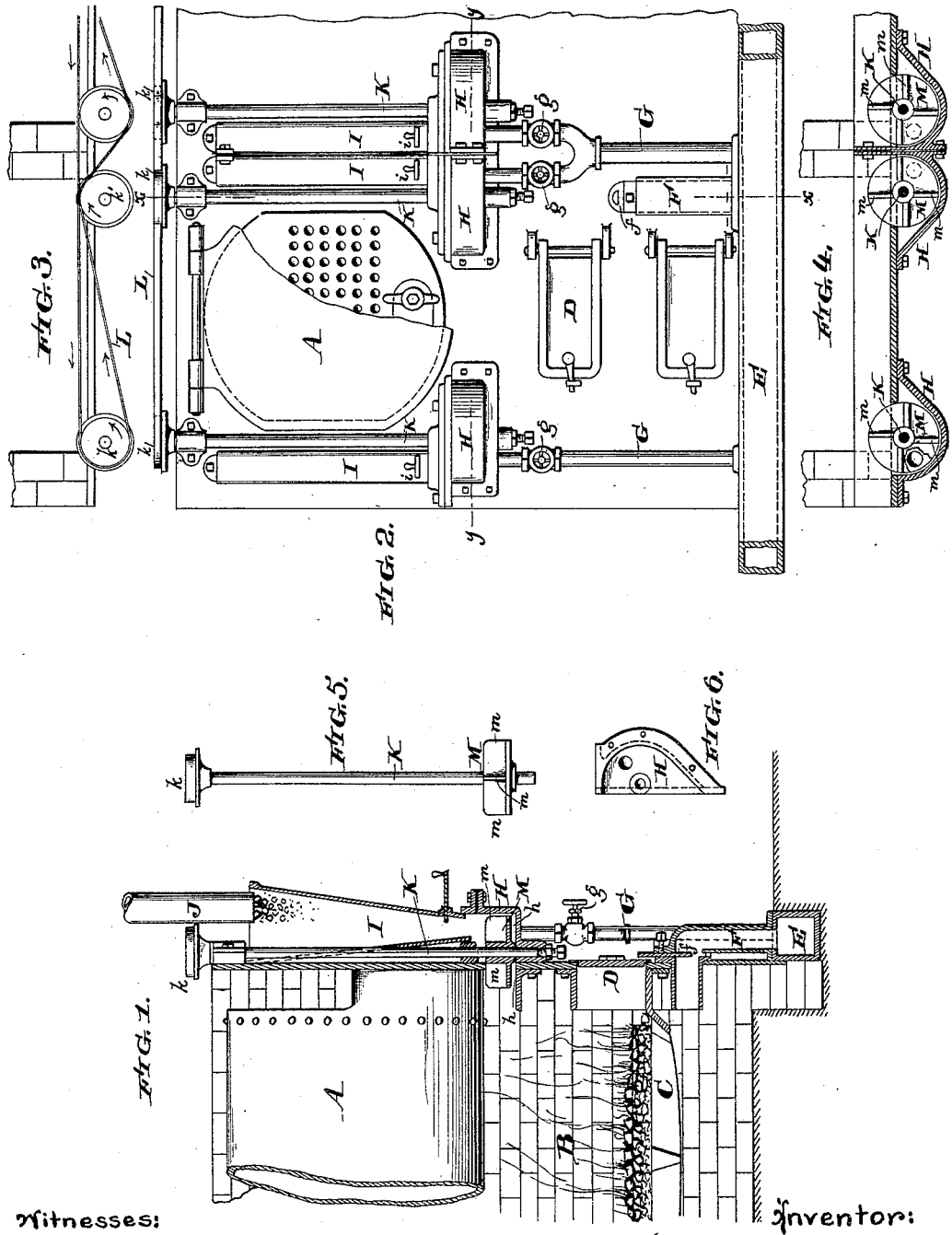

GEORGE WM. WOOD, OF PHILADELPHIA, PENNSYLVANIA.

DEVICE FOR FEEDING BOILER-FURNACES.

SPECIFICATION forming part of Letters Patent No. 446,959, dated February 24, 1891.

Application filed June 11, 1890. Serial No. 355,089. (No model.)

*To all whom it may concern:*

Be it known that I, GEORGE WM. WOOD, of Philadelphia, county of Philadelphia, State of Pennsylvania, have invented a certain new and useful Improved Device for Feeding Boiler-Furnaces, of which the following is a true and accurate description, reference being had to the accompanying drawings, which form a part of this specification.

My invention relates to boiler-furnaces, and has for its object to provide an improved device whereby culm, sawdust, or similar material may be fed into the furnace with improved results in the heat secured.

The nature of my invention will be best understood as described in connection with the drawings, in which it is illustrated, and the novel features which I desire to secure by Letters Patent are hereinafter clearly pointed out in the claims.

Reference being had to the drawings which illustrate my invention, Figure 1 is a side sectional elevation taken on the line X X of Fig. 2. Fig. 2 is a front elevation; Fig. 3, a plan view of the pulleys and belt used at the top of the furnace; Fig. 4, a cross-sectional plan view taken on the line Y Y of Fig. 2. Fig. 5 is a view of one of the rotating disks employed in my device, together with mechanism by which it is rotated; and Fig. 6 is a plan view of one of the chambers in which the disk revolves.

A is the boiler; B, the boiler-furnace; C, the grate; D, the ordinary charging-door of the furnace; E, an air-blast conduit; F, a blast-inlet leading from the conduit E beneath the grate in the furnace; G, a conduit leading from the conduit E to the bottom of the chambers H. These chambers are preferably secured to the wall of the furnace at or near the top thereof and preferably one on each side of the furnace-chamber. They open freely into the furnace, as shown.

I is a chute leading into the top of the chambers H; J, a feed-pipe through which the culm or similar material is fed into the chute.

K is a shaft, stepped at its bottom below the bottom of the chamber H and extending up through said chamber. On the top of this shaft a pulley $k$ is secured.

L, Figs. 2 and 3, is a belt, which is preferably arranged with respect to pulleys, as shown, so, for instance, as to rotate the pulley marked $k$ in the opposite direction to that marked $k'$, as shown in Fig. 3.

M is a disk secured to the shaft K so that it will rotate with it and extend over but not come in contact with the bottom of the chamber H. From the upper surface of this disk blades $m$ $m$, &c., extend upward. The space between the disk M and the bottom of chamber H is indicated by the letter $h$.

$f$ is a valve for regulating the supply of air through inlet-passage F.

$g$ $g$, &c., are valves for regulating the passage of air through the conduits G; $i$, a valve for regulating the supply of culm fed into the chamber H through the chute I.

The operation of my improved feed device is as follows: The fire having been built on the grate C, culm or similar material is fed in through the chute I and the disks M rotated as indicated by the arrows in Fig. 3. At the same time the air-blast from the conduit E is permitted to enter beneath the grate and to enter the bottom of the chamber H. The culm, passing into the chambers H, falls upon the top of the rotating disk M and is carried around with the said disk by reason of its upwardly-extending blades $m$ and thrown out into the furnace-chamber B. The air entering the chamber H issues therefrom through the space $h$ beneath the disk M in a flat jet, which jet also assists in carrying and spreading out the culm over the fuel resting on the grate, the combined action of the jet of air and the rotating disk insuring an even distribution of the culm over the grate. The jet of air issuing from beneath the disk M of course passes through the mass of culm, picking up all final comminuted particles and supplying oxygen to insure their prompt combustion, while permitting heavier particles to fall down upon the fuel resting upon the grate. Any surplus quantity of air not needed to insure the combustion of the finally-powdered combustible material entering from the chamber H serves to aid the combustion of the gases arising from the bed of fuel in the furnace.

Having now described my invention, what I claim as new, and desire to protect by Letters Patent, is—

1. In combination with a boiler-furnace, one or more chambers H, situated at or near the top thereof, a chute, as I, adapted for feeding culm or similar material into said chamber, a rotating disk M, supported in said chamber above the bottom thereof, and having blades *m m*, &c., extending from its upper surface, and an air-blast pipe, as G, entering chamber H beneath the disk M, all substantially as described, and so that the culm is carried into the fire-box by the combined action of the disk M and the layer of air entering the furnace beneath said disk.

2. In combination with a boiler-furnace, one or more chambers H, situated at or near the top thereof, a chute, as I, adapted for feeding culm or similar material into said chamber, a rotating disk M, supported in said chamber above the bottom thereof and having blades *m m*, &c., extending from its upper surface, and an air blast pipe, a branch thereof entering the furnace beneath the grate and a second branch entering chamber H beneath disk M, all substantially as and for the purpose specified.

3. In combination with a boiler-furnace, chambers H H, situated near the top and at each side thereof, chutes adapted for feeding culm or similar material, leading into said chamber, disks M, having blades *m m*, &c., secured in each chamber above the bottom thereof, mechanism adapted to rotate said disks in opposite directions, and an air-blast pipe connecting with each chamber H beneath the disks M, all substantially as and for the purpose specified.

GEORGE WM. WOOD.

Witnesses:
LEWIS R. DICK,
H. F. GRAYBILL.